(12) United States Patent
Simond (10) Patent No.: US 6,283,523 B1
(45) Date of Patent: Sep. 4, 2001

(54) SAFETY HOOK WITH IMMOBILIZABLE LOCKING LEVER

(75) Inventor: Ludger Simond, Les Houches (FR)

(73) Assignee: Etablissements Ludger Simond société anonyme, Mont Blanc (FR)

( * ) Notice: Subject to any disclaimer, the term of this patent is extended or adjusted under 35 U.S.C. 154(b) by 0 days.

(21) Appl. No.: 09/369,523

(22) Filed: Aug. 6, 1999

(30) Foreign Application Priority Data

Aug. 13, 1998 (FR) .................................................. 98 10494

(51) Int. Cl.[7] .............................. B66C 1/36; F16B 45/02
(52) U.S. Cl. ..................................... 294/82.2; 24/600.1
(58) Field of Search ............................... 294/82.19, 82.2, 294/82.21, 82.33, 82.34; 24/599.1, 599.4, 599.9, 600.1, 600.2, 601.5

(56) References Cited

U.S. PATENT DOCUMENTS

| | | | |
|---|---|---|---|
| 1,747,128 | * | 2/1930 | O'Bannon ........................... 294/82.2 |
| 1,985,596 | * | 12/1934 | Burnham ............................ 294/82.2 |
| 3,831,994 | * | 8/1974 | Martin ............................... 294/82.21 |
| 4,546,523 | * | 10/1985 | Bailey ................................ 24/599.4 |
| 5,257,441 | * | 11/1993 | Barlow ............................ 24/600.1 X |
| 5,579,564 | * | 12/1996 | Rullo et al. ...................... 24/599.4 X |
| 5,735,025 | * | 4/1998 | Bailey ............................ 294/82.2 X |
| 5,896,630 | * | 4/1999 | Smith et al. ....................... 24/600.01 |

FOREIGN PATENT DOCUMENTS

| | | | |
|---|---|---|---|
| 2439330 | | 5/1980 | (FR) . |
| 2485658 | | 12/1981 | (FR) . |
| 2520712 | * | 8/1983 | (FR) .................................. 294/82.2 |
| 2106584 | | 4/1983 | (GB) . |
| WO9519505 | | 7/1995 | (WO) . |

* cited by examiner

Primary Examiner—Johnny D. Cherry
(74) Attorney, Agent, or Firm—William H. Eilberg (57) ABSTRACT

A safety hook in accordance with the invention comprises a body closed by a pivoting finger which can be prevented from rotating by a transverse locking lever. The locking lever is articulated on a lever pivot on the pivoting finger and has a notch engaging over a front lug of the body in the locked position, into which it is biased by a spring. A mobile abutment can be selectively positioned on the locking lever to prevent it pivoting in the unlocking direction. This assures reliable locking by means of a Locking lever that is easy to manipulate and immobilize.

9 Claims, 9 Drawing Sheets

SAFETY HOOK WITH IMMOBILIZABLE LOCKING LEVER

BACKGROUND OF THE INVENTION

1. Field of the Invention

The present invention concerns safety hooks which lock automatically in which locking is assured by a transverse locking lever engaging between a pivoting closure finger and an opposite portion of the safety hook body to selectively prevent pivoting of the locking finger in the opening direction.

2. Description of the Prior Art

Safety hooks of the above kind that are locked automatically by a transverse lever are described in documents FR 2 439 330 A and FR 2 485 658 A.

In both of the above documents, the safety hook comprises a safety hook body having an opening selectively closed by a pivoting finger articulated at its first end about a transverse rotation pivot, with a transverse locking lever mounted to be able to pivot about a lever pivot between a locking position, in which it is engaged between the pivoting finger and an opposite portion of the body to prevent rotation of the pivoting finger and toward which it is biased by spring means, and an unlocked position, in which it releases the pivoting finger so that it can rotate in its opening direction. The pivot of the locking lever is in said opposite portion of the body, and the free end of the locking lever engages over the pivoting finger.

In document FR 2 485 658 A, the locking lever is generally rectilinear and is entirely engaged between the pivoting finger and the opposite portion of the body, near the free end of the pivoting finger. As a result, the locking lever reduces the opening capacity of the safety hook, and constitutes a component that is relatively inconvenient to operate. This device is therefore not suitable for mountaineering use or for working in high places, where safety conditions must be complied with without necessitating difficult and irksome intervention by the user. What is more, there is nothing to prevent pivoting of the locking lever, which can therefore be unlocked unintentionally.

In document 2 439 330 A, the transverse locking lever is at a greater distance from the free end of the pivoting finger, which improves the opening capacities. Also, the locking lever is L-shaped with a longitudinal branch that projects radially beyond the opposite portion of the body, which facilitates manipulating the locking lever. However, the free end of the locking lever comprises two parallel branches disposed each on opposite sides of the pivoting finger to engage over lateral bosses on the pivoting finger to lock the safety hook. The parallel branches at the end of the locking lever constitute relatively weak components that may be deformed in use. If they are deformed away from each other, there is a risk of inhibiting all locking capacity of the locking lever, so compromising the reliability and the safety of the safety hook. What is more, the locking lever projects away from the body in an exaggerated manner and constitutes a protruding component that can interfere with use and to which force can be applied unintentionally.

In the above document, a sliding ring, mounted on the opposite portion of the body, can immobilize the locking lever to prevent it pivoting toward the unlocked position. The drawback of this is that it is therefore necessary to manipulate the locking ring each time so that the locking lever can then be manipulated to unlock the safety hook.

The problem addressed by the present invention is that of the designing a new hook structure which is locked automatically by a transverse locking lever, which assures both reliable and effective locking and a maximum opening capacity of the safety hook, and which assures selective immobilization or permanent releasing of the locking lever, enabling the user to choose between single locking or double locking. The change from the immobilized state to the released state must be effected simply and quickly by intentional action of the user.

The invention equally aims to design a safety hook structure of the above kind that is particularly simple and inexpensive to manufacture.

SUMMARY OF THE INVENTION

To achieve the above and other objects, the invention consists in a safety hook which locks automatically including a safety hook body having an opening closed by a pivoting finger articulated at its first end about a transverse rotation pivot, a transverse locking lever mounted to pivot about a lever pivot between a locking position toward which it is biased by spring means and in which it is engaged between the pivoting finger and an opposite portion of the body to prevent rotation of the pivoting finger, and an unlocked position in which it releases the pivoting finger so that it can rotate in the opening direction, and immobilizing means for selectively immobilizing the locking lever against rotation away from the locked position to prevent unlocking of the safety hook; according to the invention: the immobilizing means is a mobile abutment, mounted on the locking lever, and movable on guides between an immobilizing position in which it bears against a portion of the body to oppose pivoting of the locking lever, and a release position in which it remains away from the portion of the body to allow unlocking pivoting of the locking lever.

In one embodiment, the guides include a shallow first notch in which the mobile abutment is engaged in he immobilizing position, and a deeper notch in which he mobile abutment can engage in the release position, he notches extending in a generally radial direction way from the body.

The mobile abutment is advantageously biased by a spring which pushes it away from the body, either into the bottom of the first notch or toward the bottom of the second notch.

The spring preferably also biases the locking lever toward its locked position and pushes the mobile abutment away from the body.

Other objects, features and advantages of the present invention will emerge from the following description of particular embodiments, given with reference to the accompanying drawings.

DETAILED DESCRIPTION OF THE PREFERRED EMBODIMENTS

In both embodiments shown in the figures, a safety hook in accordance with the invention which locks automatically comprises a safety hook body 1 having a closed first loop 2 and an opening second loop 3. The opening loop 3 comprises an opening 4, delimited by a first end 5 and a second end 6 of the body. The opening 4 is selectively closed by a pivoting finger 7 articulated at its first end 8 to the first end 5 of the body about a transverse rotation pivot 9. In the closed position shown in FIG. 1, the second end 10 of the pivoting finger 7 engages over the second end 6 of the body.

In the embodiments shown, the safety hook has a particular and advantageous shape. Thus, considering the longitudinal axis I—I of the safety hook, joining the center of the closed first loop 2 and the top 11 of the opening second loop 3, the body 1 comprises a longitudinal branch 12 generally parallel to and relatively close to the axis I—I, whereas the pivoting finger 7 and the corresponding oblique second branch 13 of the body 1 diverge from the longitudinal axis I—I. From the top 11, the oblique second branch 13 extends obliquely to the second end 6 of the body. The longitudinal branch 12 of the body 1 has at its base an oblique portion 14 which converges progressively with the longitudinal axis I—I to form an external recess 115 in the portion of the body 1 opposite the pivoting finger 7.

Figure 5:
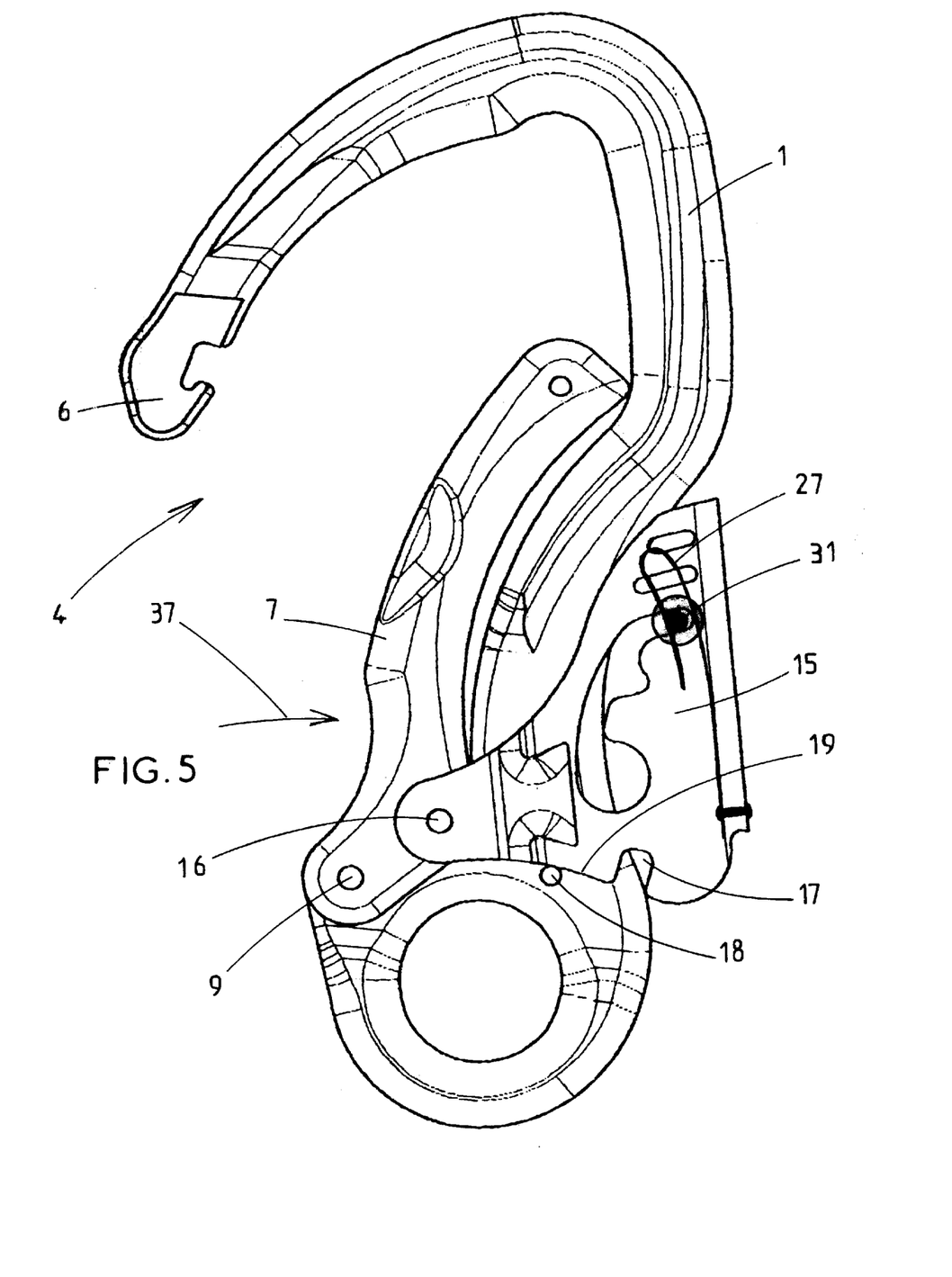
FIG. 5 is a front view of the safety hook from FIG. 1 open.
Figure 9:
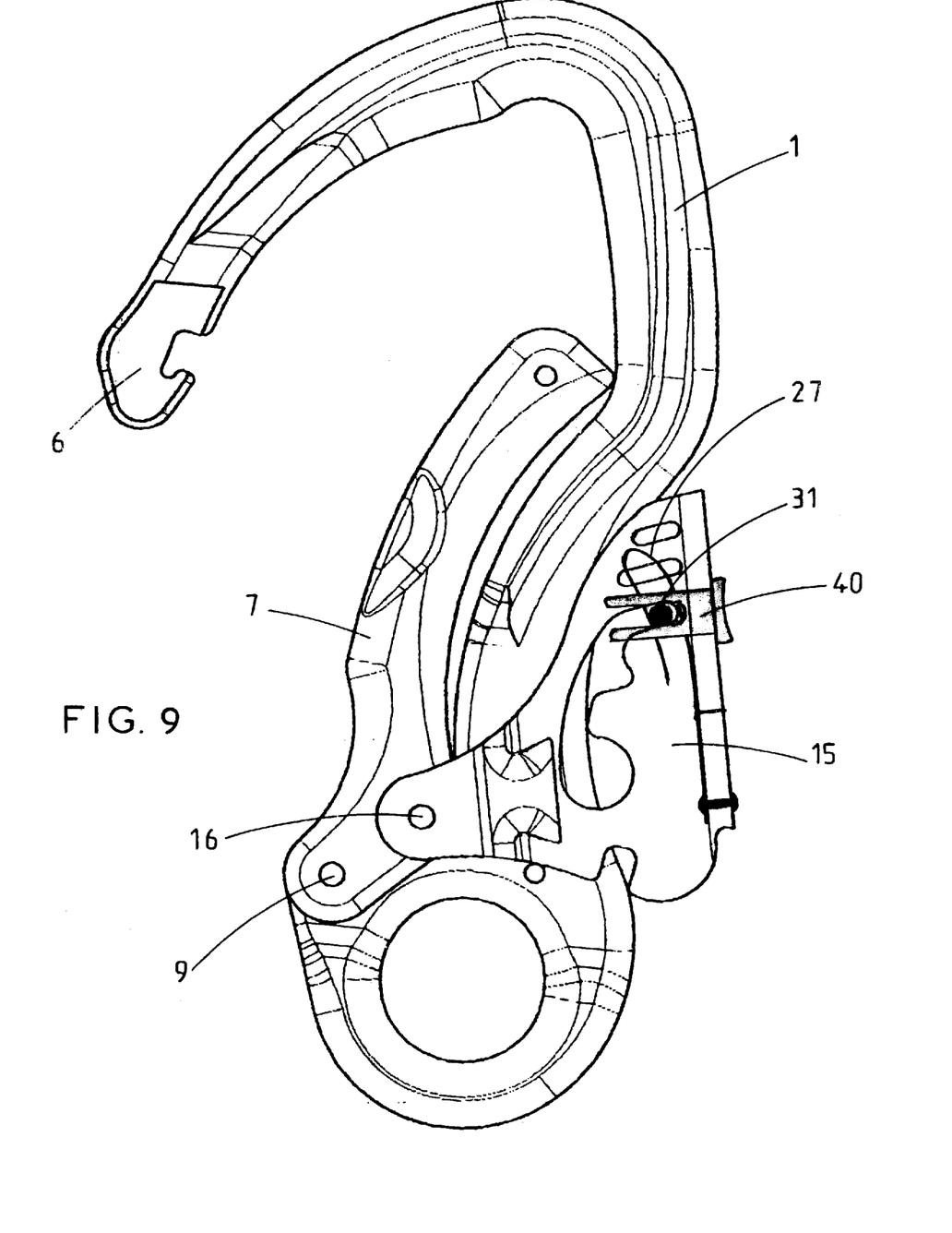
FIG. 9 is a front view of the safety hook from FIG. 6 open.

Because of the oblique second branch 13 and the oblique portion 14 of the body 1, the opening second loop 3 is elongate along an oblique axis II—II with a back of the opening second loop 3 constituted by the top 11 and the longitudinal branch 12 of the body, the back being opposite the opening 4 closed by the pivoting finger 7. When the pivoting finger 7 is open, as shown in FIG. 5 or FIG. 9, the pivoting finger 7 bears against the oblique portion 14 of the body 1, and in this way frees a large space within the opening second loop 3. The safety hook then constitutes a wide open hook which is very easy to fit to an anchor member such as a bar, a ring, a cable, a rope.

The oblique portion 14 and the pivoting finger 7 are advantageously curved as shown in the figures. However, the radially outermost portion 107 of the pivoting finger 7 is set back from the line joining the farthest projecting areas 106 and 102 of the body 1 on either side of the pivoting finger 7. The pivoting finger 7 is therefore not rotated if the two protruding areas 106 and 102 of the safety hook are in contact with a plane surface.

The safety hook in accordance with the invention further comprises a transverse locking lever 15 mounted to pivot about a lever pivot 16 at an intermediate position on the pivoting finger 7. In the advantageous embodiment shown, the lever pivot 16 is nearer the first end 8 than the second end 10 of the pivoting finger 7, for example about one fifth of the length of the pivoting finger 7 from the first end 8 of the pivoting finger 7.

The locking lever 15 has an engaging part 17 for co-operating with a corresponding bearing area 18 in a portion of the body 1 opposite the pivoting finger 7.

In the embodiment shown in the figures, the engaging part 17 comprises at least one notch formed in a ramp consisting of the bottom edge 19 of the locking lever, and the bearing area 18 of the body 1 comprises at least one front lug projecting from the body 1 parallel to the lever pivot 16. The bottom edge 19 of the locking lever 15 is generally perpendicular to the longitudinal axis I—I of the safety hook, while the notch 17 constituting the engaging part is generally longitudinal, that is to say parallel to the longitudinal axis I—I. In the locked position shown in FIG. 1, the front lug 18 engaged in the notch 17 prevents movement of the locking lever 15 toward the right, and thus locks the safety hook by opposing pivoting of the pivoting finger 7, which is held in the closed position.

Thus, in the locked position, the engaging part 17 and the corresponding bearing area 18 of the body 1 oppose transverse movement of the locking lever 15 and the pivoting finger 7.

Figure 4:
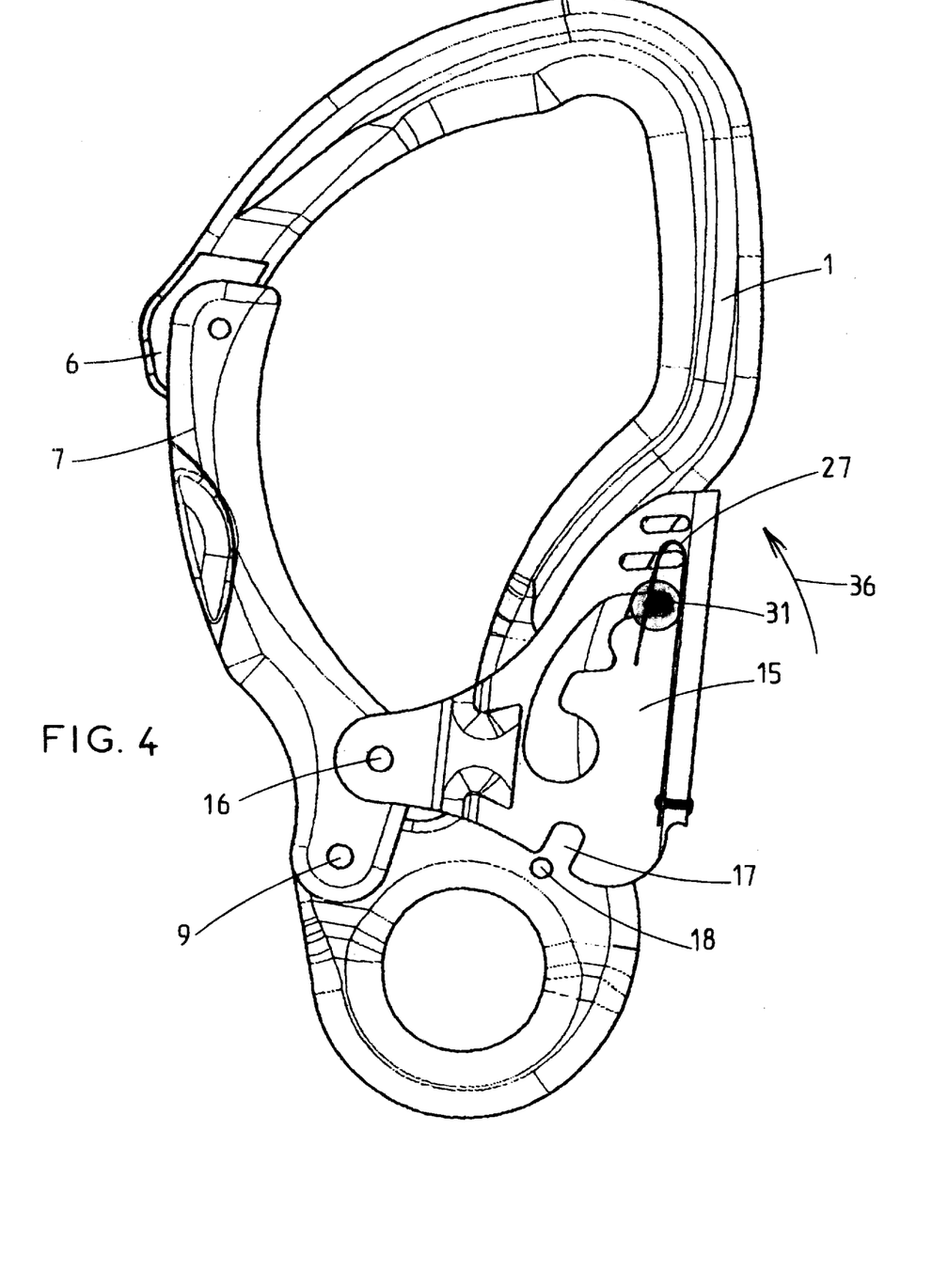
FIG. 4 is a front view of the safety hook from FIG. 1 closed and unlocked.

In the unlocked position shown in FIG. 4, the locking lever 15 has pivoted, and the engaging part 17 or notch has escaped from the bearing area 18 or front lug of the body 1 to allow transverse movement of the locking lever 15 and to allow the pivoting finger 7 to pivot in the opening direction.

Figure 2:
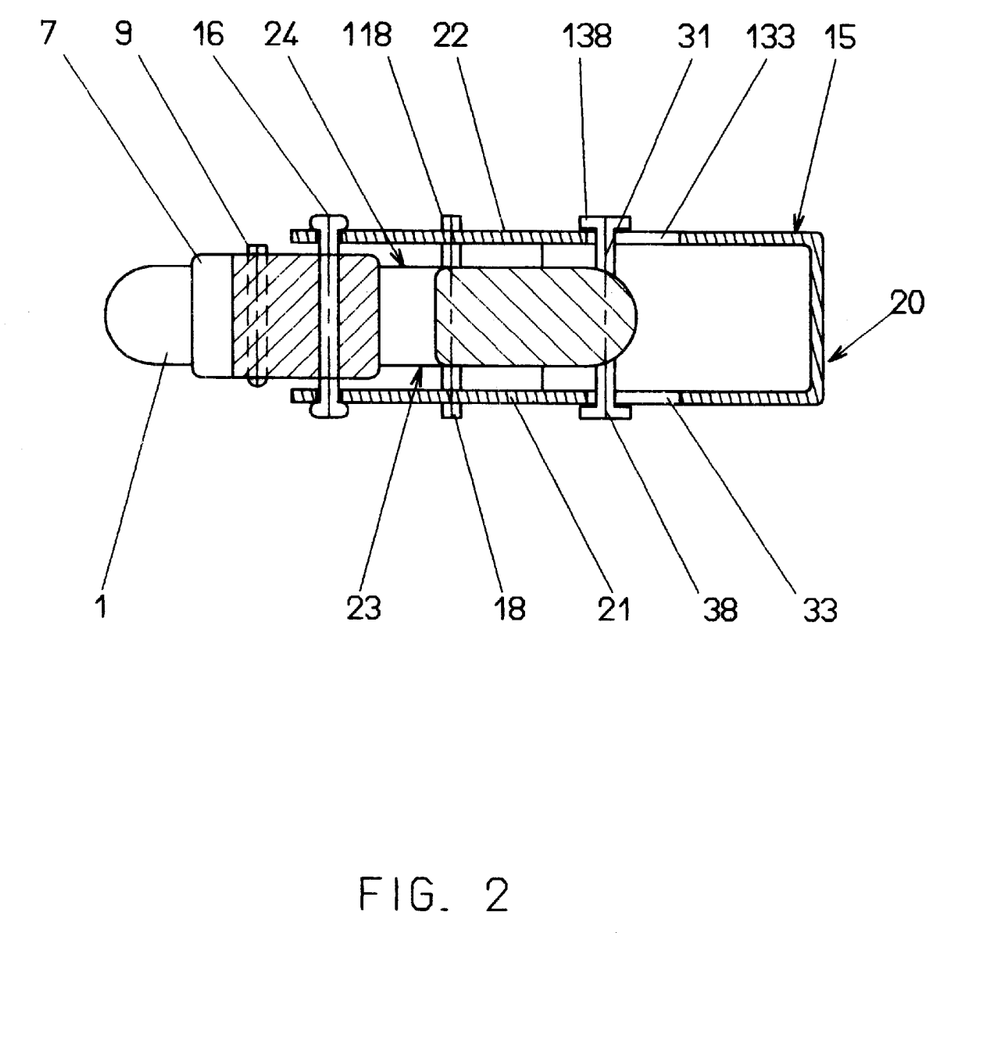
FIG. 2 is a plan view in section taken along the line A—A in FIG. 1.

As shown in FIG. 2, the locking lever 15 in this embodiment is a plate bent to a U-shape with two parallel branches 21 and 22 respectively connected by a bearing wall 20. The branch 21 faces the front face 23 of the body 1, while the branch 22 faces the rear face 24 of the body 1. The free ends of the branches 21 and 22 are joined by the lever pivot 16 which allows the locking lever 15 to pivot but prevents any risk of the branches 21 and 22 moving apart.

Figure 1:
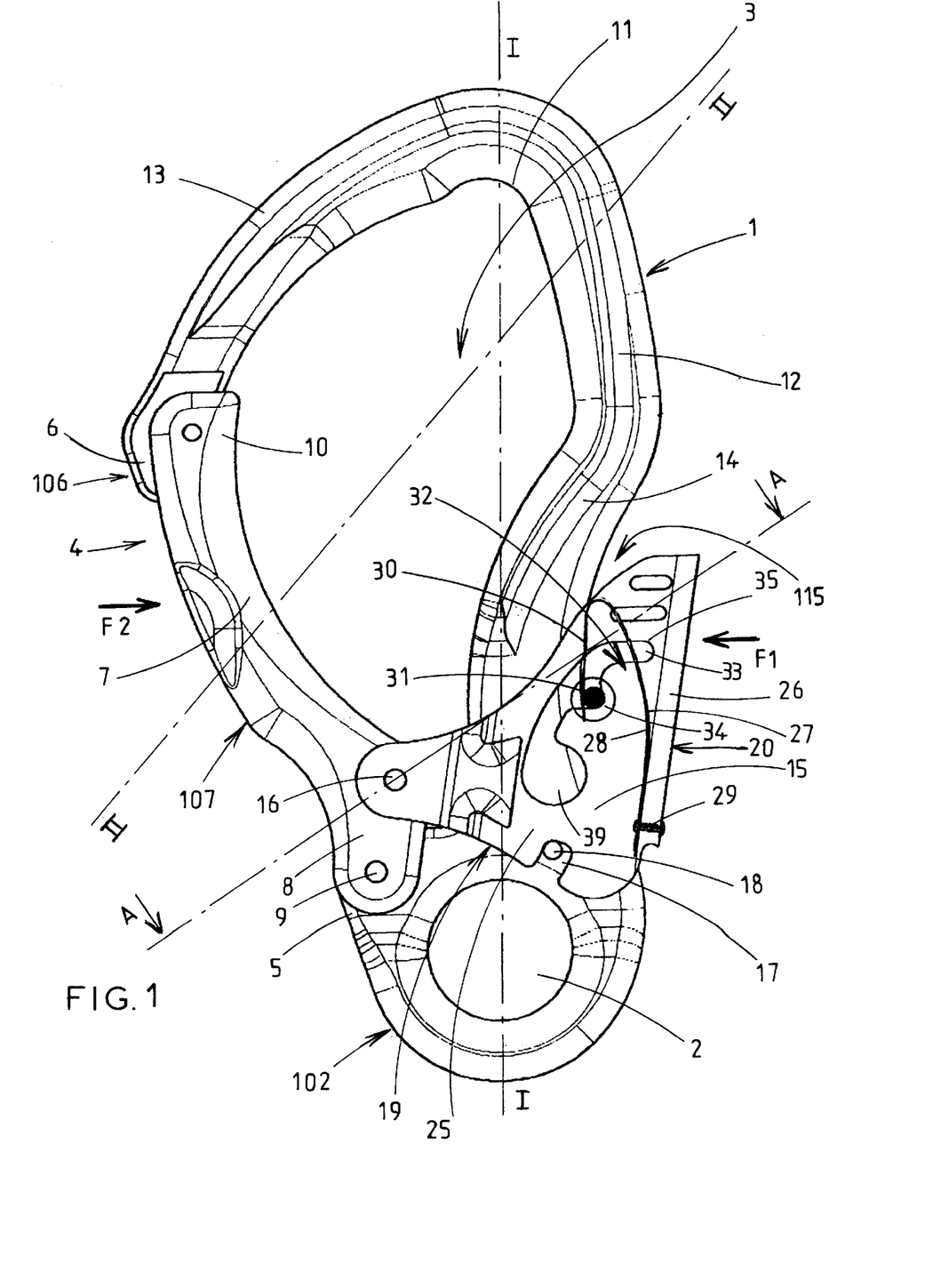
FIG. 1 is a front view of a first embodiment of a safety hook in accordance with the present invention, closed and locked, with the locking lever immobilized.

As shown in FIG. 1, in which it is seen from the front, the locking lever 15 is preferably generally L-shaped with a transverse locking branch 25 between the lever pivot 16 on the pivoting finger 7 and the engaging part 17, and with a longitudinal manipulator branch 26 projecting radially beyond the opposite portion of the body 1, although it preferably remains within the external recess 115 to avoid it protruding in an exaggerated fashion. The longitudinal manipulator branch 26 is extended longitudinally toward the top 11 of the body 1 of the safety hook beyond the transverse area of the safety hook containing the lever pivot 16. The bearing wall 20 is extended by the longitudinal manipulator branch 26 to constitute a more comfortable bear for the user, who has to depress the bearing wall 20 to pivot the locking lever 15 between the locked position (FIG. 1) and the unlocked position (FIG. 4).

In the embodiment shown, because of the position of the engaging part 17 in the form of a notch in the bottom edge 19 of the locking lever 15, when it rotates in the unlocking direction, the locking lever 15 pivots in the direction opposite the rotation of the pivoting finger 7 in the opening direction: as shown in FIG. 1, to unlock the safety hook, the locking lever 15 pivots anti-clockwise, while to open the hook, the pivoting finger 7 pivots clockwise. As a result, to unlock the safety hook, the user applies a force F1 to the bearing wall 20 of the locking lever 15 in a direction radially toward the center of the safety hook. At the same time, or slightly afterwards, the user applies to the pivoting finger 7 a force F2, also radially toward the center of the safety hook but in the opposite direction to the force Fl, to move the pivoting finger 7 to the open position. This makes it very easy to unlock and open the safety hook by the user simultaneously applying pressure to generate the forces F1 and F2.

Alternatively, the engaging part 17 could have a different shape, for example it could be a slot in the locking lever 15, in which case unlocking the safety hook would imply rotating the locking lever 15 clockwise in the outward direction, to unlock the safety hook by rotating the locking lever 15 in the same direction as the rotation that opens the pivoting finger 7.

Referring again to FIG. 2, it can be seen that the bearing area of the body is in reality provided by a front first lug 18, and by a corresponding rear second lug 118. The front lug 18 cooperates with a notch 17 as shown in FIG. 1, while the rear lug 118 cooperates with a similar notch formed in the second branch 22 of the locking lever 15 (not shown in the figure).

FIG. 1 also shows a spring 27 engaged between the locking lever 15 and the body 1 to bias the locking lever 15 into the locked position in which the notch 17 is in bearing engagement with the front lug 18.

In the embodiment shown, the spring 27 is a curved flexible leaf spring with two generally parallel branches 28 and 30 with a first end of a first branch 28 fixed to the locking lever 15 in a fixing area 29 and its second end bears against the outside face of the longitudinal branch 12 of the body 1 and is bent so that it connects to a second branch 30 generally parallel to the first branch 28. The first branch 28 of the spring 27 is therefore functionally engaged between the body 1 and the locking lever 15 to push the locking lever 15 toward its locked position.

In the embodiments shown, the safety hook further comprises immobilizing means for selectively immobilizing the locking lever 15 against rotation and preventing unlocking of the safety hook.

Figure 3:
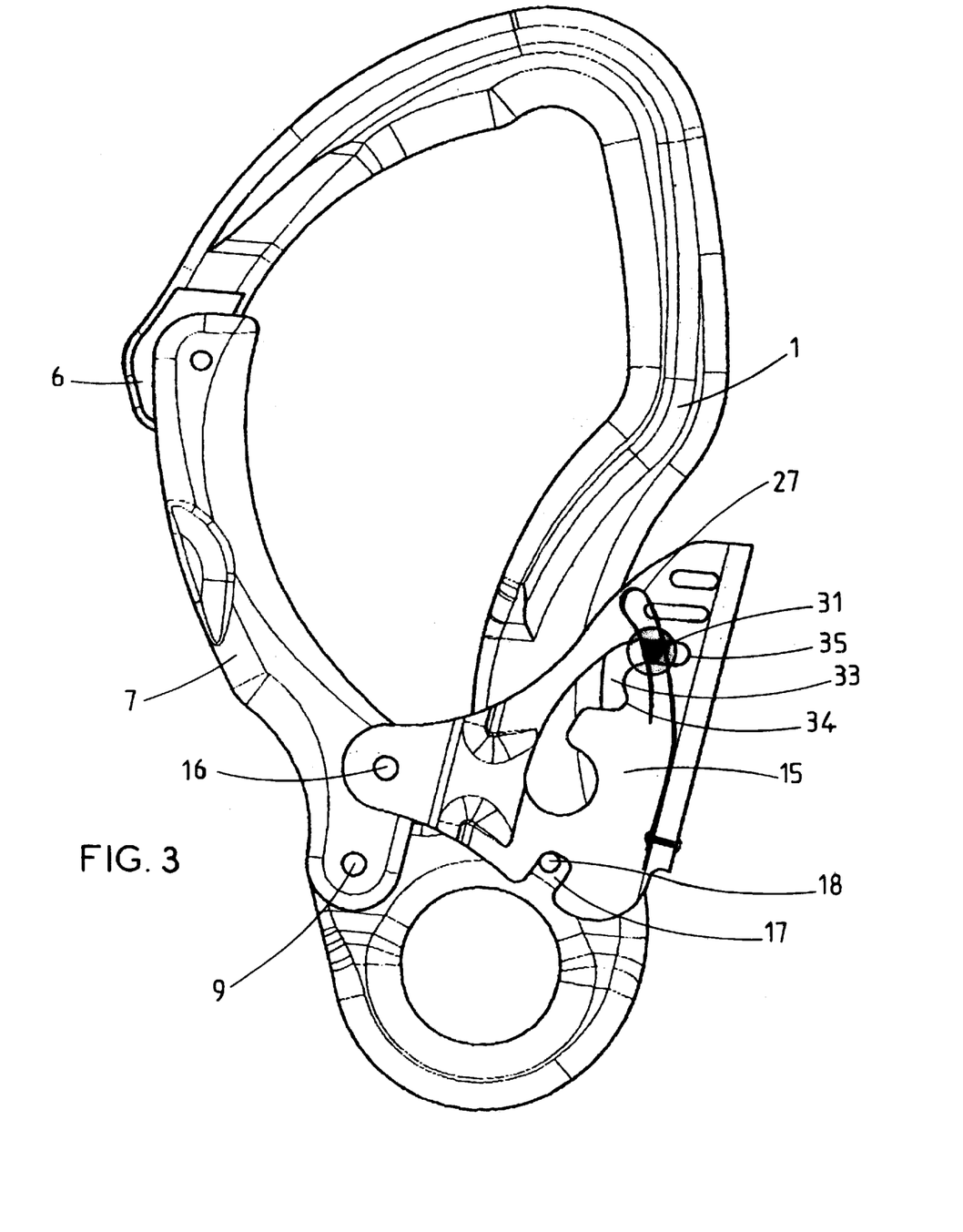
FIG. 3 is a front view of the safety hook from FIG. 1 closed and locked with the locking lever released.

In the figures, the immobilizing means comprise a mobile abutment 31, mounted on the locking lever 15, and movable on guides 32 between an immobilizing position, shown in FIG. 1, in which the mobile abutment 31 bears against a portion of the body 1 to oppose pivoting of the locking lever 15, and a release position shown in FIG. 3, in which the mobile abutment 31 is moved away from the portion of the body 1 to authorize unlocking pivoting of the locking lever 15.

The mobile abutment 31 is a front-to-back pin mounted to slide in two lateral slots 33 and 133 (FIG. 2) forming the guides 32 in respective parallel branches 21 and 22 of the locking lever 15. Each slot, for instance the lateral slot 33, has a shallow first notch 34 in which the mobile abutment 31 is engaged in the immobilizing position, and a deeper second notch 35 in which the mobile abutment 31 can engage in the release position. The notches 34, 35 extend in a generally radial direction away from the body 1.

The second branch 30 of the spring 27 is functionally engaged between the body 1 and the mobile abutment 31 to push the mobile abutment 31 away from the body 1, either into the bottom of the first notch 34 or toward the bottom of the second notch 35.

How the safety hook works will now be explained with reference to FIGS. 1 to 5.

In the closed, locked and immobilized position shown in FIG. 1, the mobile abutment 31 is engaged in the first notch 34 of the lateral slot 33, into which it is pushed by the spring 27. In this first notch 34, the mobile abutment 31 is in the immediate vicinity of the lateral face of the body 1, preventing rotation of the locking lever 15 in the clockwise direction.

In FIG. 3, the mobile abutment 31 has moved into the second notch 35 of the lateral slot 33. The mobile abutment 31 is then away from the body 1, and allows the locking lever 15 to rotate counterclockwise. The locking lever 15 remains in the locked position, however, into which it is biased by the spring 27, preventing pivoting of the pivoting finger 7.

FIG. 4 shows the safety hook unlocked and closed: the user has pivoted the locking lever 15 in the unlocking direction 36 about its lever pivot 16, against the return force exerted by the spring 27, moving the notch 17 away from the front lug 18. The pivoting finger 7 remains in the closed position, however, into which it is biased by a return spring that is not shown in the figures.

In FIG. 5, the user has pivoted the pivoting finger 7 to its open position, in the direction of the arrow 37 and about its transverse rotation pivot 9, freeing the opening 4. During this movement, the front lug 18 can slide on the ramp consisting of the bottom edge 19 of the locking lever 15.

In the embodiment shown in FIGS. 1 to 5, and as seen best in FIG. 2, the mobile abutment 31 is a front-to-back pin with two heads 38 and 138 at its ends which are wider than tile portion of the lateral slot 33 including the notches 34 and 35. An end portion 39 of the lateral slot 33 is widened for the end heads 38 and 138 to pass through during assembly. The end heads 38 and 138 constitute the manipulator member which the user employs to move the mobile abutment 31 between the immobilizing position and the release position.

Figure 6:
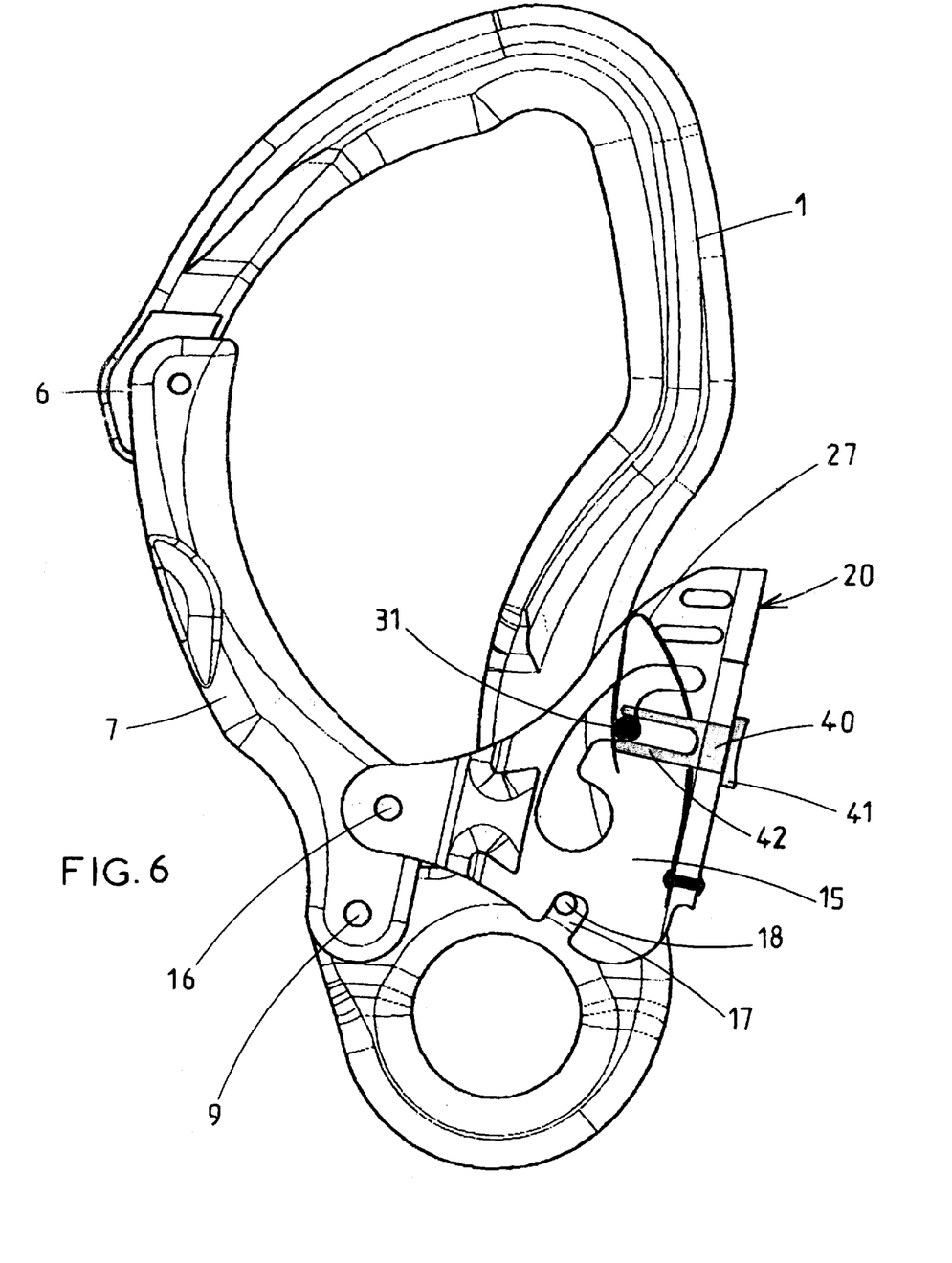
FIG. 6 is a front view of a second embodiment of a safety hook in accordance with the present invention, closed and locked with the locking lever immobilized.
Figure 7:
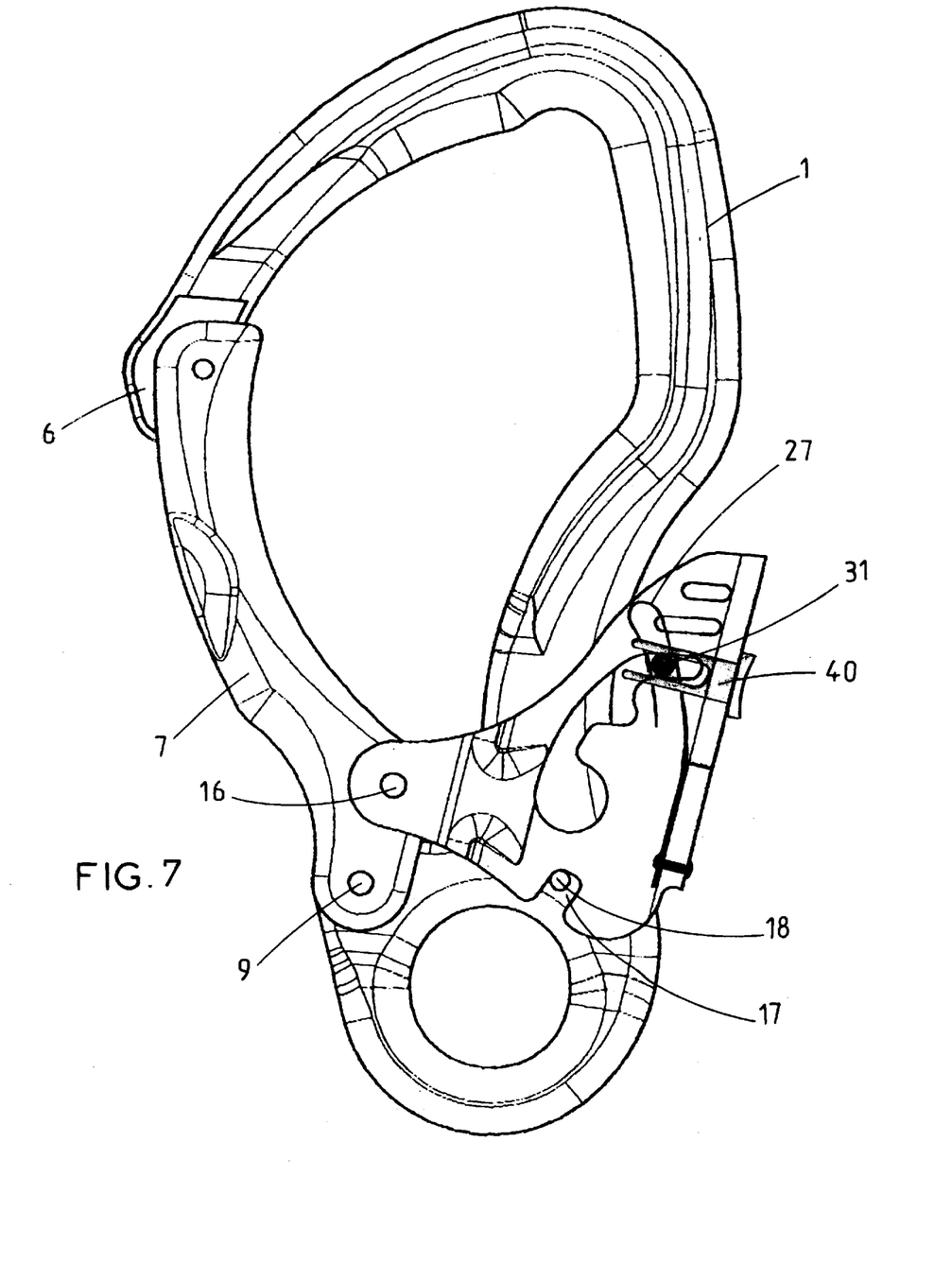
FIG. 7 is a front view of the safety hook from FIG. 6 closed and locked with the locking lever released.
Figure 8:
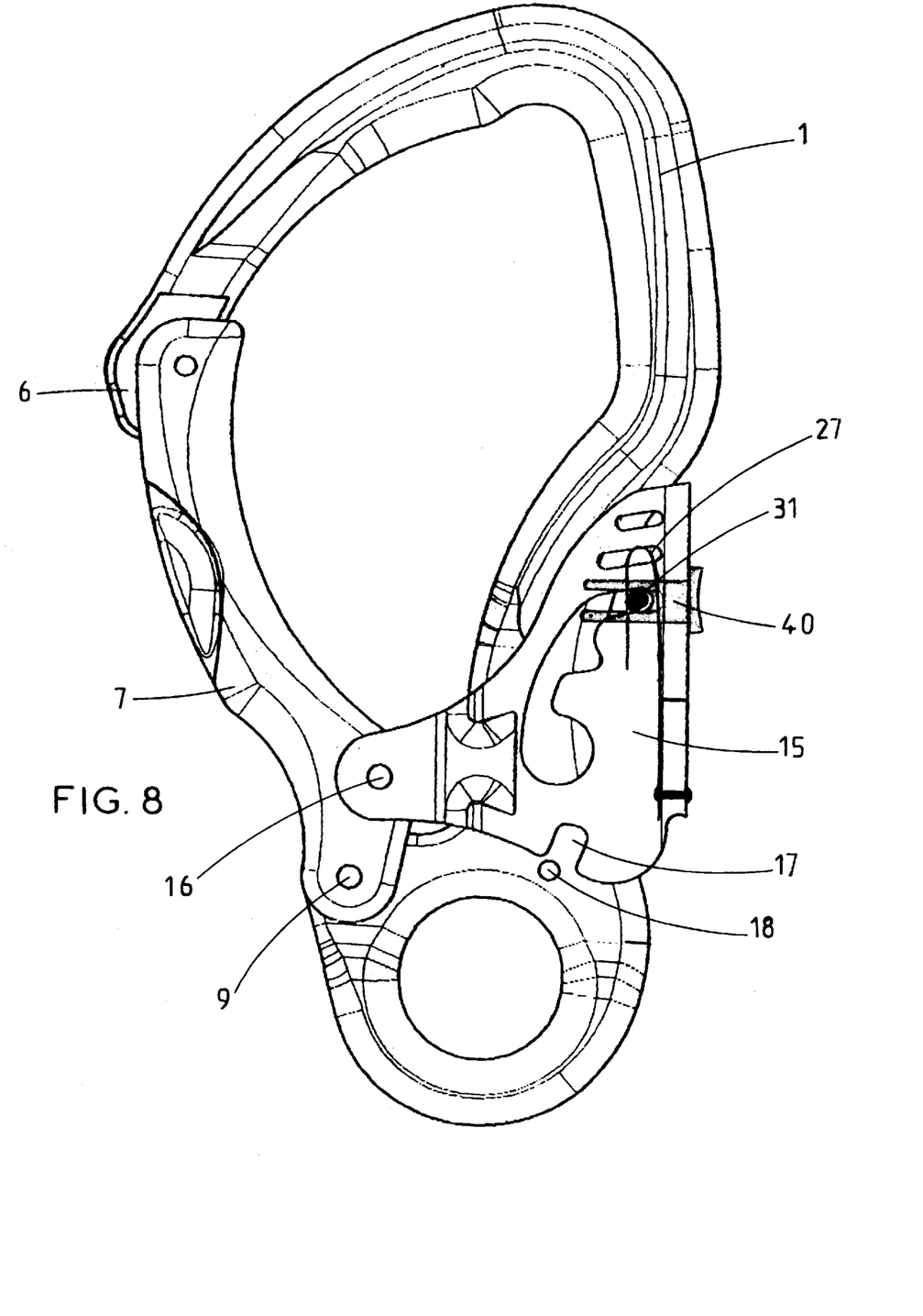
FIG. 8 is a front view of the safety hook from FIG. 6 closed and unlocked.

In the embodiment shown in FIGS. 6 to 9, the mobile abutment 31 is moved between the immobilizing position shown in FIG. 6 and the release position shown in FIGS. 7 to 9 by a slider 40 having a head 41 extending to the outside of the bearing wall 20 of the locking lever 15, and having a fork 42 engaged on either side of the front-to-back pin forming the mobile abutment 31. The slider 40 slides longitudinally in a longitudinal slot formed in the bearing wall 20 of the locking lever 15, between the immobilizing position shown in FIG. 6 and the release position shown in FIGS. 7 to 9.

Otherwise, the safety hook shown in FIGS. 6 to 9 comprises the same components as the hook shown in FIGS. 1 to 5, and works in exactly the same manner, as shown in the figures.

In another embodiment, the lever pivot 16 is in the portion of the body 1 opposite the pivoting finger 7. The locking lever 15 then has an engaging part co-operating with a corresponding bearing area of the pivoting finger 7 in the locked position to oppose opening pivoting of the pivoting finger 7, the engaging part escaping from the bearing area of the pivoting finger 7 in the unlocked position of the locking lever 15 to allow the pivoting finger 7 to pivot in the opening direction. This embodiment corresponds to a structure of the locking lever 15 as described in document FR 2 439 330 A, to which reference may usefully be made.

The particular shape of the body 1 of the safety hook, comprising an external recess 115 in the body portion opposite the pivoting finger 7, associated with the fact that the locking lever 15 has a longitudinal manipulator branch 26 which remains inside the external recess 115 of the body 1, constitutes an advantageous combination that can be used independently of the presence or absence of means for immobilizing the locking lever 15, and regardless of the position chosen for the lever pivot 16 on the pivoting finger 7 or on the opposite portion of the body 1.

The present invention is not limited to the embodiments explicitly described, but includes variants and generalizations thereof within the scope of the following claims.

There is claimed:

1. A safety hook which locks automatically including a safety hook body having an opening closed by a pivoting finger, the pivoting finger having a first end, the pivoting finger being articulated at said first end about a transverse pivot, a transverse locking lever mounted to pivot about a lever pivot on the pivoting finger, between a locked position toward which it is biased by spring means and in which it mechanically connects said pivoting finger with an opposite portion of said body to prevent rotation of said pivoting finger, and an unlocked position in which the locking lever releases said pivoting finger so that the pivoting finger can rotate in the opening direction, and immobilizing means for selectively immobilizing said locking lever against rotation away from said locked position to prevent unlocking of said safety hook and comprising a mobile abutment, mounted on said locking lever, and movable on guides between an immobilizing position in which it bears against a portion of said body to oppose pivoting of said locking lever, and a release position in which it remains away from said portion of said body to allow unlocking pivoting of said locking lever.

2. The safety hook claimed in claim 1 wherein said guides include a shallow first notch in which said mobile abutment is engaged in said immobilizing position, and a deeper second notch in which said mobile abutment can engage in said release position, said notches extending in a generally radial direction away from said body.

3. The safety hook claimed in claim 2 wherein said mobile abutment is biased by a spring which pushes it away from said body, either into the bottom of said first notch or toward the bottom of said second notch.

4. The safety hook claimed in claim 3 wherein said spring also biases said locking lever toward its locked position and pushes said mobile abutment away from said body.

5. The safety hook claimed in claim 3 wherein said spring is a curved flexible leaf spring with two generally parallel branches, with a first branch functionally engaged between said body and said locking lever to push said locking lever toward its locked position, and a second branch functionally engaged between said body and said mobile abutment to push said mobile abutment away from said body.

6. The safety hook claimed in claim 1 wherein:

said locking lever has two parallel branches joined by a bearing wall, said guides are constituted by two lateral slots, each of which is in a respective one of said parallel branches, said mobile abutment is a front-to-back pin mounted to slide in said lateral slots.

7. The safety hook claimed in claim 6 wherein said mobile abutment comprises two end heads constituting a manipulator member enabling a user to move said mobile abutment between said immobilizing position and said release position.

8. A safety hook as claimed in claim 6 further comprising a slider including a head projecting to the outside of said bearing wall of said locking lever and including a fork engaged in opposite sides of said front-to-back pin forming said mobile abutment, and sliding longitudinally in a longitudinal slot in said bearing wall of said locking lever between said immobilizing position and said release position.

9. The safety hook claimed in claim 1 wherein:

said lever pivot is disposed at an intermediate position on said pivoting finger, said locking lever comprises an engaging part cooperating with a corresponding bearing area of said body in said locked position to oppose transverse movement of said locking lever and said pivoting finger, said engaging part escaping from said bearing area of said body in said unlocked position of said locking lever to allow said pivoting finger to pivot in the opening direction.

* * * * *

UNITED STATES PATENT AND TRADEMARK OFFICE
CERTIFICATE OF CORRECTION

PATENT NO.     : 6,283,523 B1
DATED          : September 4, 2001
INVENTOR(S)    : Ludger Simond It is certified that error appears in the above-identified patent and that said Letters Patent is hereby corrected as shown below:

<u>Title page,</u>
Item [73], Assignee,
In the address of the Assignee, please insert -- Chamonix -- before Mont Blanc (FR).

Signed and Sealed this

Twelfth Day of November, 2002

*Attest:*

*Attesting Officer*

JAMES E. ROGAN
*Director of the United States Patent and Trademark Office*